United States Patent [19]

Romeo et al.

[11] B 3,995,545
[45] Dec. 7, 1976

[54] CARD ADVANCEMENT MECHANISM

[75] Inventors: Albert J. Romeo, Center Square; Edward G. Sherbert, Plymouth Meeting, both of Pa.

[73] Assignee: Decision Data Computer Corporation, Horsham, Pa.

[22] Filed: Oct. 1, 1973

[21] Appl. No.: 402,328

[44] Published under the second Trial Voluntary Protest Program on April 6, 1976 as document No. B 402,328.

[52] U.S. Cl. .................................. 101/19; 101/2; 234/126
[51] Int. Cl.² .......................................... B44B 5/00
[58] Field of Search ...................... 101/2, 19, 93 C; 234/126; 346/128, 76; 340/172.5

[56] References Cited
UNITED STATES PATENTS

| | | | |
|---|---|---|---|
| 2,753,789 | 7/1956 | Gardinor et al. | 101/19 |
| 2,770,188 | 11/1956 | Nolan | 101/93 C |
| 2,969,727 | 1/1961 | Rudd et al. | 101/19 |
| 2,972,296 | 2/1961 | Haug | 101/93 C |
| 3,088,398 | 5/1963 | Daly et al. | 101/19 |
| 3,183,518 | 5/1965 | Henry et al. | 346/76 |
| 3,440,955 | 4/1969 | Howard et al. | 101/93 C |

*Primary Examiner*—Edgar S. Burr
*Assistant Examiner*—E. M. Coven
*Attorney, Agent, or Firm*—Synnestvedt & Lechner

[57] ABSTRACT

Apparatus for controlling the advancement of punch cards or like sheet material past a plurality of work stations such as may comprise a data recorder used in the preparation and processing of punch cards. Control means are provided to sense the nature of an operation being performed on a particular card as well as the presence of punch cards at other of the plural work stations comprising the system and in response thereto selectively energize the advancement mechanism such that each punch card processed through the system will be advanced at an optimum rate. In the event no punching or printing operation is to take place on the punch card the speed of the advancement mechanism is increased considerably in excess of that which would otherwise enable the advancement mechanism to be accurately stopped. The processing rate achieved by the advancement mechanism is further enhanced by implementing the control apparatus in such a manner that the system may be conveniently shifted from a high speed mode of operation wherein the entire system is dedicated to the processing of a particular card therethrough, to a time-overlap mode of operation wherein the stacking of card $n$ takes place simultaneously with the punching and/or printing of card $n+1$. A high degree of throughput is achieved in the time-overlap mode of operation by ensuring a continuous feed of punch cards into the card preparation portion of the data recorder thus facilitating the simultaneous printing on two successive cards by the same print mechanism. This latter feature ensures a minimal separation between successive punch cards, which separation is within a fraction of an inch.

8 Claims, 23 Drawing Figures

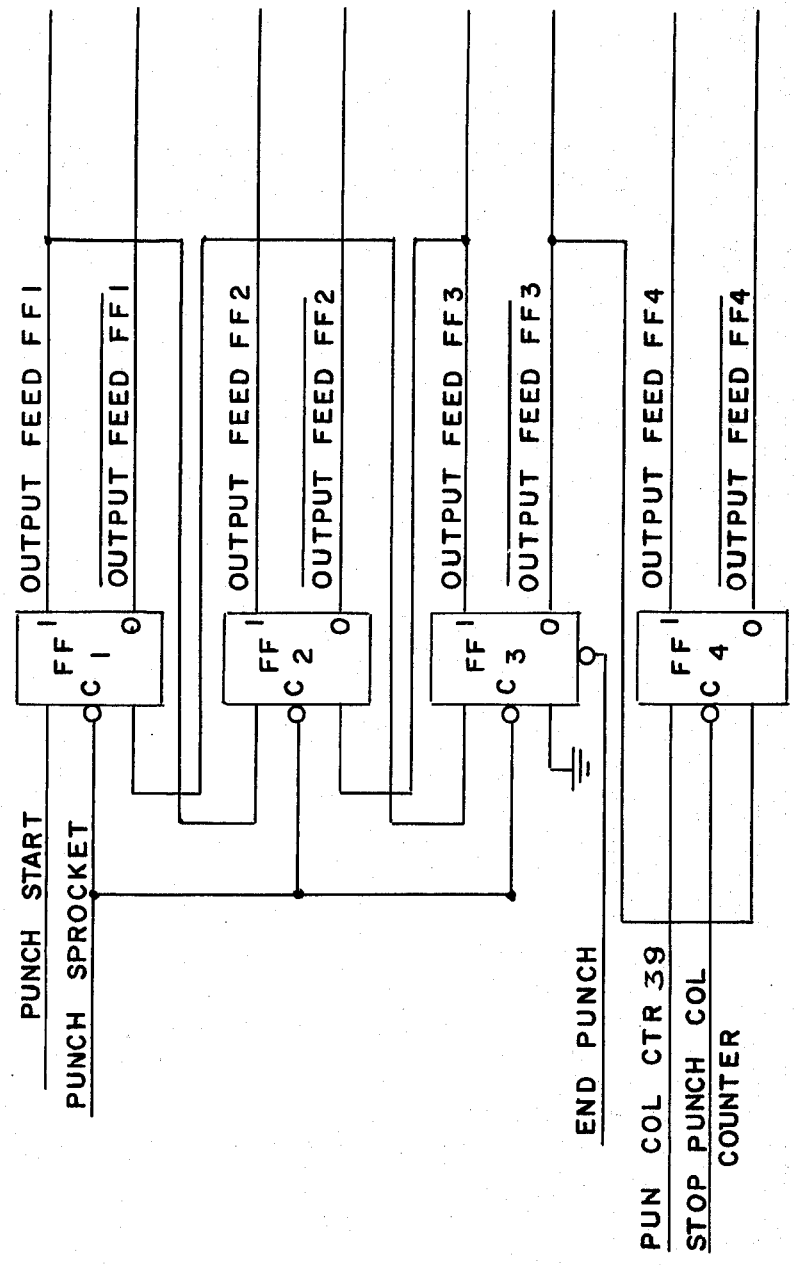

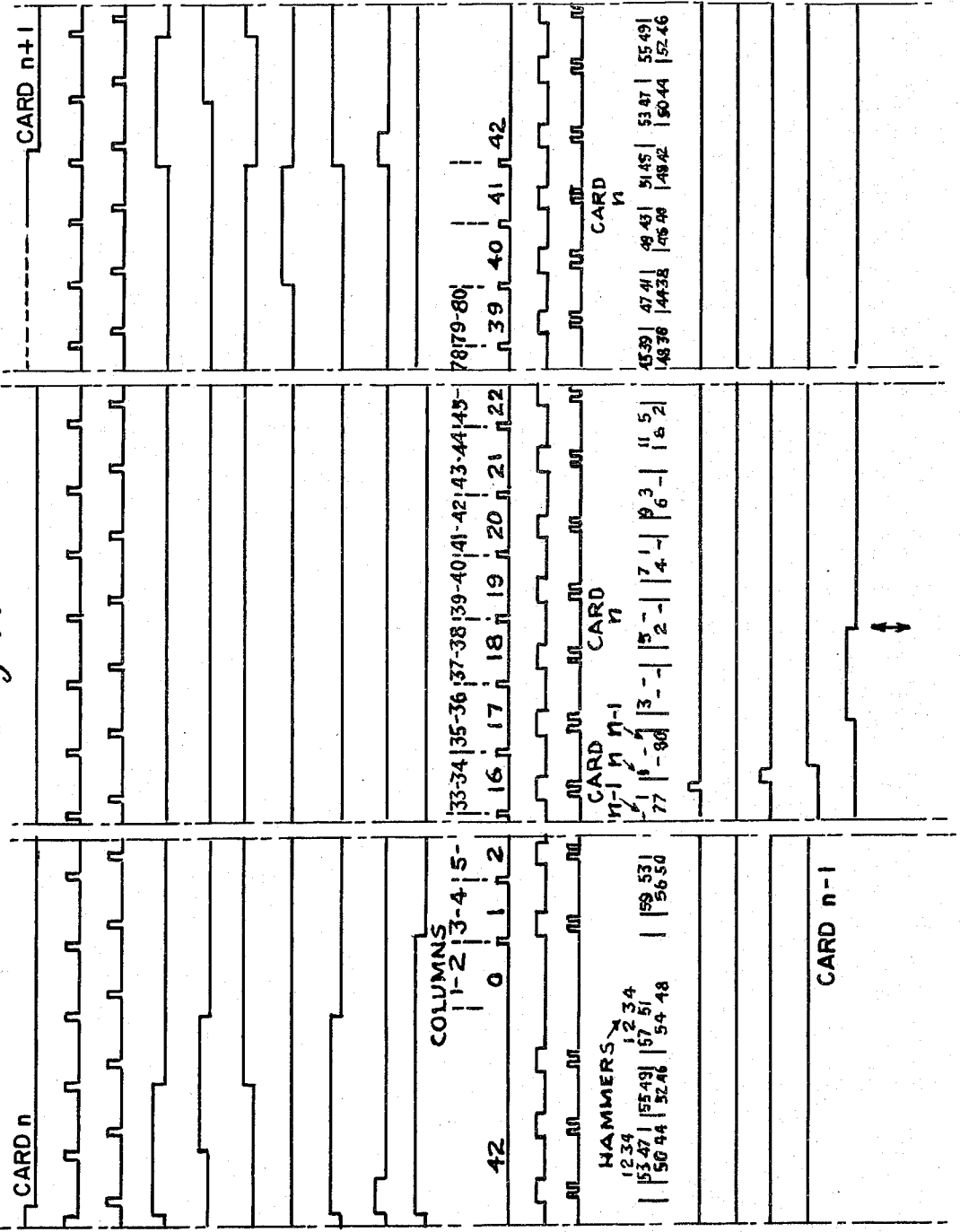

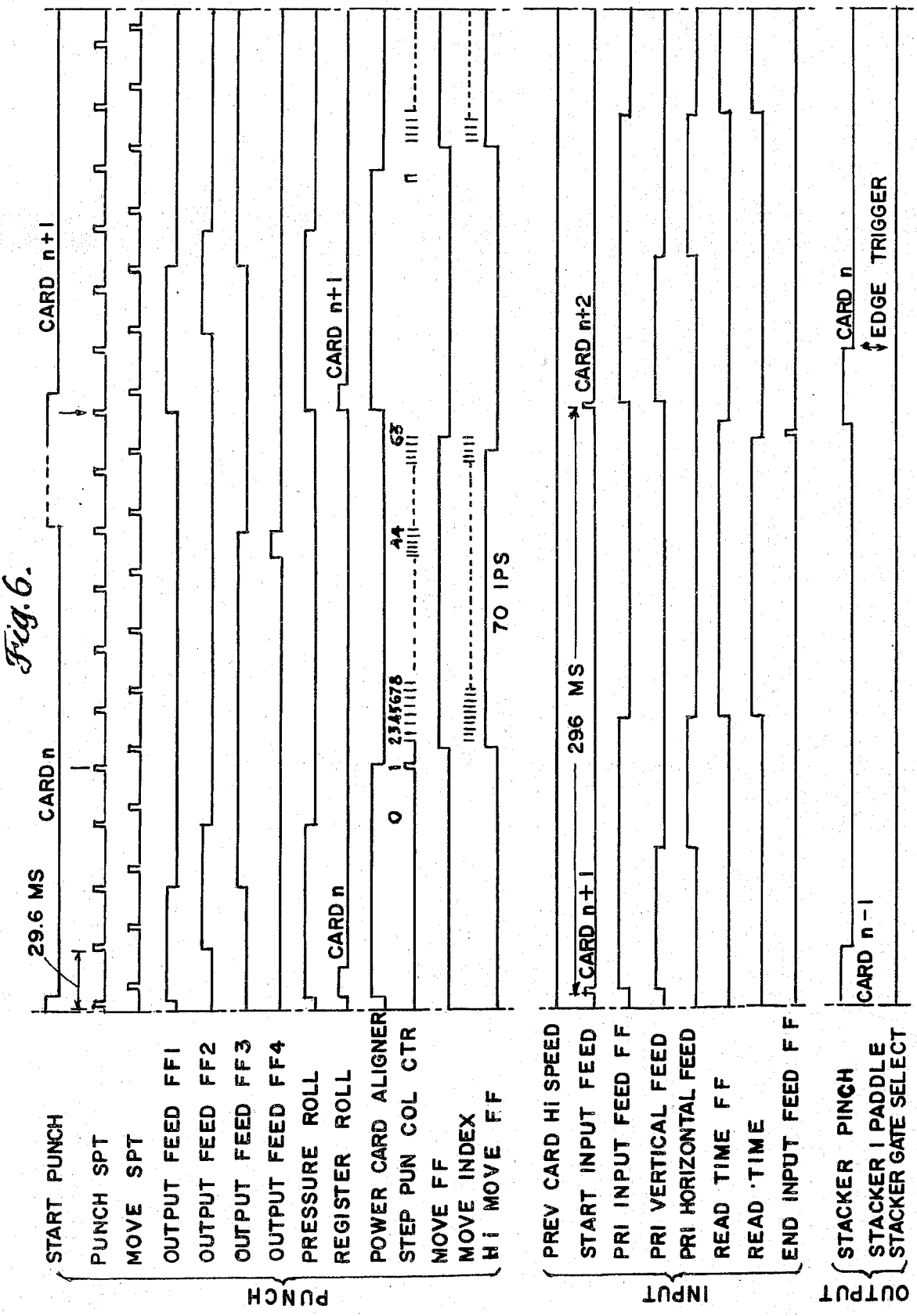

CARD ADVANCEMENT MECHANISM

SUMMARY OF THE INVENTION

This invention pertains to the processing of punch cards in a data recorder apparatus of the type adapted to perform all of the card preparation and processing operations normally performed with such media including card feeding, scanning, punching, printing, and stacking. Historically, the design of such data recorders has been such that each processing operation has been performed logically independent of the other. In such arrangements, a punch card which is to be both punched and printed will be logically tracked first through the punch station and then independently through the print station and from thence into the output section. Although such arrangements result in certain efficiencies in processing there remains a substantial loss of throughput because of the need to completely clear a punch card through any one of the stations before advancing another card from the preceding station.

As a consequence of the logically independent processing techniques employed in the prior art data recorders, rather substantial gaps appear between the trailing edge of one card and the leading edge of the subsequent card. Such gaps may represent a substantial amount of processing time as for example when the operation being performed is in the nature of a duplicate instruction wherein the information on punch cards comprising a first deck is entered into blank cards comprising a second deck. Thus, in the execution of the duplicate instruction each of the pre-punched cards is the subject of a READ ONLY operation with the informational content thereof being stored in memory where it is used to punch and print the next card, a blank card.

Since the path of travel of a punch card through the data recorder is the same no matter what the nature of the processing operation being performed, the previously blank card must be completely processed through the punch and print stations prior to the time the next pre-punched card is processed therethrough notwithstanding the fact that no punching or printing operation is to be performed on the pre-punched card. This accounts for the substantial gap between cards as noted hereinabove, and as a direct consequence thereof there is a substantial reduction in throughput.

It is an object of the present invention to more efficiently process a punch card through the various stages of a data recorder and to thereby realize a resultant increase in throughput. This objective is realized by designing the data recorder such that in certain modes of operation the various stages of the data recorder operate synchronously in processing a card therethrough while in other modes of operation processing occurs on a time-overlap basis.

In the synchronous mode of operation, all stages of the data recorder are dedicated to the processing of a single card such that as a signal is generated to release a new card into the processing portion of the apparatus, control signals are generated for transfer to the other portions of the data recorder to effect the further processing of the same card and also initiate the introduction of the succeeding card.

An additional feature of the subject data recorder which makes possible the synchronous mode of operation concerns the ability to process a punch card through one or more of the various sections at different processing rates depending upon the nature of the operation to be performed and hence the expected activity of the particular card in those sections. This feature is in part achieved by designing the card advancement mechanism to operate at various speeds.

In the "time-overlap" mode of operation the processing of punch cards through the punch-print areas is such that immediately upon completion of processing of a card through one section, a new card is introduced thereto; the processing operation in the other section being temporarily interrupted to permit the system to accommodate the newly introduced card after which the processing operation in both the punch and print sections resumes. As a result, punch cards may be processed through the system such that the separation between 2 successive 80 column cards is no more than a fraction of an inch. The nominal separation between successive punch cards ensures a substantial throughput which in the preferred embodiment of the present invention is guaranteed at 200 cards per minute when the data recorder is operating in the synchronous mode and 45 cards per minute when operating in the time-overlap mode.

It should be understood that the figures given above are exemplary only and do not constitute a limitation of the principles on which the present invention is based; rather, these operating rates results from design restraints placed on the system by the mechanical components used to implement the data recorder embodying the present invention. It should thus be apparent that as further improvements are made in the mechanical components, a consequent increase in throughput will be realized without departing from the spirit of the invention, all of which should become more readily apparent from the following specific descriptions thereof.

BRIEF DESCRIPTION OF THE DRAWINGS

FIG. 5 illustrates comparative timing of basic pulses provided by the control and sequence selection circuits of FIGS. 4 as utilized for processing a punch card through the subject data recorder in the time overlap mode of operation.

FIG. 6 illustrates comparative timing of basic pulses provided by the control and sequence selection circuits of FIGS. 4 as utilized for processing a punch card through the subject data recorder in the synchronous mode of operation.

DETAILED DESCRIPTION

Figure 1:
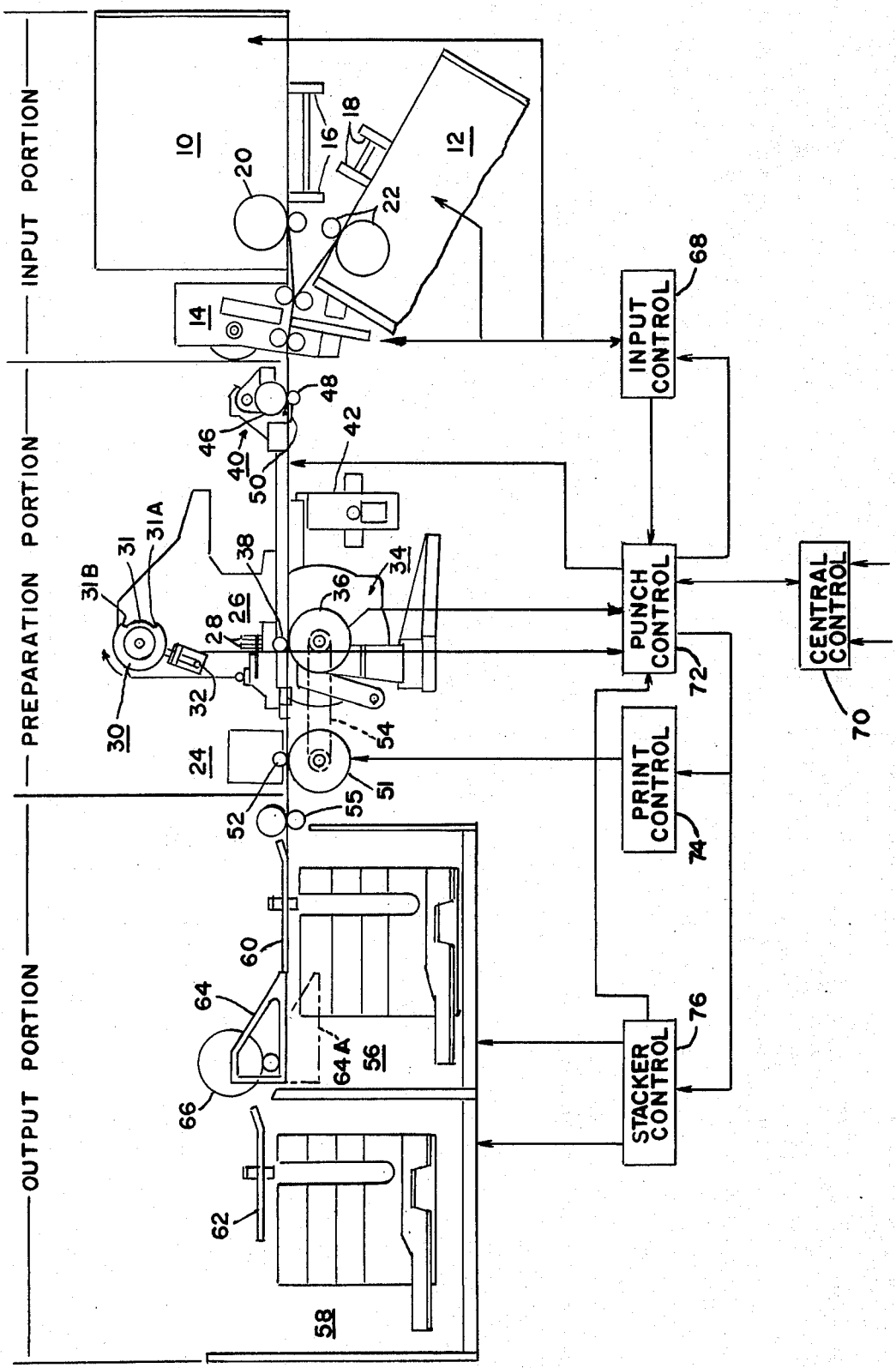
FIG. 1 is a fragmentary plan section showing the principal operating portions of a data recorder embodying the features of the present invention and the associated control logic used in conjunction therewith.

Referring first to FIG. 1, therein disclosed is a fragmentary plane section of a data recorder which may be viewed as comprising three portions: an input portion; a card preparation portion; and, an output portion. For purposes of this description, the input portion may be considered as comprising primary and secondary card hoppers, 10 and 12, for storing prepunched and/or blank cards, together with a read station 14 wherein the informational contents of the punch cards are scanned. Details of the primary and secondary card hoppers utilized in the preferred embodiment of the present invention are more fully disclosed in the co-pending application of Robert J. Miller filed June 1, 1973, under Ser. No. 365,855 and assigned to the assignee of the present invention.

The mechanical details for feeding punch cards from either the primary hopper 10 or the secondary hopper 12 through the read station 14 are clearly explained in the aforementioned Miller application and for purposes of this description it should be sufficient to note that feeding is accomplished by initially offsetting the top card from the balance of the deck of cards by means of the vertical feed rolls 16 or 18 respectively and then subsequently feeding the card from the offset position along a path extending generally parallel to the planes of the cards in the deck by means of horizontal feed rolls 20 and 22 respectively.

Pre-punched cards, after being fed from the primary or secondary hoppers are scanned in card reader 14 on a columnar basis. The card reader may be of the type disclosed in the co-pending application of Robert J. Miller & Walter Dorfman filed May 17, 1971 under Ser. No. 374,373 and assigned to the assignee of the present invention. The informational content of a card being scanned may be used in the subsequent preparation of a new card in the manner disclosed and claimed in U.S. Pat. No. 3,706,074 which issued to the assignee of the present invention.

From the input portion, the punch card passes into the preparation portion of the data recorder wherein information previously entered into the punch card may be interpreted, i.e. printed on the face of the card, at a print station indicated generally by numeral 24; or as an alternative, information from a previously processed punch card may be entered via a punch mechanism indicated generally by numeral 26, either as is or supplemented by information coming from the keyboard or from a remote terminal interfaced to the data recorder. Details of the mechanical construction of the punch 26 sufficient to an understanding of the present invention are disclosed in the co-pending application of Alexander Hunter filed June 29, 1973 under Ser. No. 374,869 and assigned to the assignee of the present invention.

For purposes of this description it should be sufficient to note that punch 26 is of the type that simultaneously punches two columns of information into the punch card. This capability is represented by the two punch pins 28, each of which represents a single row of punches aligned along a column of the punch card. Operatively coupled to the pins 28 is a punch timing disc 30 having an indentation 31 thereon. The disc 30 is driven in conjunction with the punch 26 and may be considered as rotating in a clockwise direction. The cammed surface of the timing disc 30 cooperates with a follower 32. The latter is equipped with electrical signal generating means to generate a first signal PUNCH SPROCKET (SPT) upon sensing the leading edge 31A of the indentation 31 and a second signal MOVE SPROCKET (SPT) upon sensing the trailing edge of the indentation at 31B.

As should be apparent from a further explanation of the operation of the present invention the PUNCH SPT and MOVE SPT signals occur once every 29.6 milliseconds during the processing of a punch card and for certain purposes are used as control signals for sequentially advancing a punch card through the data recorder. Also used for this same purpose but for a difference mode of operation are MOVE INDEX signals generated by motor 34. Motor 34 is a variable speed motor which may be of conventional design and which is adapted to advance a punch card, by means of a directly coupled index roll 36 and an associated pinch roll 38, at a variable rate of up to 70 inches per second (IPS). Although a continuously variable operating speed is a desirable feature of the motor used in the preferred embodiment of the present invention, it will suffice if motor 34 is designed to advance the punch card at a linear speed of either 35 IPS or 70 IPS.

Registration of a punch card such that the first two columnar positions are accurately aligned with respect to punches 28 is accomplished through the cooperative relationship of the pinch roll 38, a register roll assembly 40, and a power card aligner 42 as outlined in the aforementioned Hunter application. For purposes of this description, it is sufficient to note that a punch card before being registered at the punch station 26 is first advanced from the input portion into a wait station. In being advanced into the wait station, the leading edge of the punch card passes through the gap separating the register roll 46 from its cooperating pinch roll 48 and at the same time moves the spring mounted pusher blade 50 out of the way such that the latter rides harmlessly on top of the punch card.

Once at the wait station, the leading edge of the punch card is within a few inches of the punch 26. Depending upon the mode of operation a punch card upon arriving at the wait station may either be automatically advanced into registration at the punch station or it may wait an indefinite period of time until released to the punch station by the operator or some other signal generated within the system or entered therein via the interface. The advancement and final registration of the punch card at the punch station are the result of two synchronized steps involving the register roll 46 and the pusher blade 50. The register roll 46 is effective during the first step to rapidly advance the trailing edge of the punch card into operative relationship with the pusher blade 50. The latter describes a reciprocatory movement essentially parallel to the path of travel of the punch card such that the pusher blade first rides off of the trailing edge of the punch card and after reaching the extreme rearward point in its trajectory reverses direction so as to pick up the trailing edge of the punch card and carry the latter forward into final registration at the end of the second step. As the punch card is being advanced into registration at the punch station the pinch roll 38 is retracted slightly to permit the leading edge of the punch card to pass between it and the index roll 36. At the same time the power card aligner 42 is actuated to insure proper lateral orientation of the punch card.

The drive means for the print station 24 comprises an index roll 51 and a cooperating pinch roll 52 identical to the corresponding members at the punch station 26. It will be further noted that the index roll 51 is coupled to the drive shaft of the corresponding index roll 36 by means of a belt 54 so as to provide a synchronized drive to the punch card as it is advanced through the print station from the punch station. The significance of this latter feature will become more apparent upon further discussion of the various modes of operation of the subject data recorder.

The print mechanism 24 is of the type adapted to print simultaneously in a plurality of columns. An incomplete character set appears on each of the print wheels and in the preferred embodiment a complete character set is distributed over two print wheels thus necessitating a corresponding number of stops to effect the printing of each columnar position. This is accomplished by having two complete sets of characters on four print wheels which are sufficiently spaced from one another so as to facilitate printing without interference from their associated components. In this manner a one to one relationship is maintained as to the number of printing cycles and punching cycles required to completely process a punch card.

Upon completion of the preparation operation, the punch card is advanced into the output portion at a rate of 70 IPS by means of a stacker pinch roll indicated generally as member 55. The punch card after entering the output portion of the data recorder is stacked in either a first or a second stacker indicated generally in FIG. 1 as members 56 and 58 respectively. The punch card is deflected into either stacker 1 or stacker 2 by a stacker paddle 60 or 62 which when timely actuated drives the card into the selected stacker. In order to stack a punch card in stacker number 2 it is necessary to set a stacker gate 64 into its forward position as is indicated by the dotted outline 64A. When the stacker gate 64 is in the backward position and the stacker paddle 60 is timely actuated the card will be deposited into the first stacker. In order to complete the stacking of a punch card in the number 2 stacker a continuous roll 66 is provided to transport the card into this area. In the lower portion of FIG. 1, diagrammatically represented as members 68, 70, 72, 74, and 76, are the major control assemblies of the data recorder. These control assemblies are used to generate the control signals necessary to the processing of punch cards in the apparatus Details of the control logic are to be found in FIGS. 4A through 4P.

Consideration is now given to the operation of the subject data recorder in terms of its alternative modes of operation i.e. synchronous and time-overlap. It is important to note that the sequence of events in the execution of a command in the synchronous mode differs substantially from those occurring in the time-overlap mode. Thus, in the latter mode the release of a punch card from the input portion occurs in the latter portion of an operative cycle. In the simultaneous mode the release thereof occurs simultaneously with the initiation of registration of a punch card at the punch. In somewhat similar manner, the release of a card to the output portions occurs in the latter portion of a synchronous mode cycle of operation whereas in the time-overlap mode this step occupies the early part of the succeeding cycle. The significance of these and other differences which distinguish the alternative modes of operation of the instant data recorder should become more readily apparent from the discussion which follows.

The synchronous mode of operation may best be explained with reference to FIGS. 2A and 2B which conjunctively depict the time relationship of the leading edge of a card in the execution of a READ ONLY command commencing from the time a signal is generated to release a card from one or another of the input hoppers 10 and 12 until the card is finally stacked in one or another of the output stackers 56 or 58. In interpreting FIGS. 2A and 2B it should be understood that the generally diagonally oriented lines represent the leading edge of three successive cards processed through the system. The uppermost diagonal line represents Card $n+1$ and as such depicts a complete operative cycle commencing with the scrubdown of the card; i.e., the time during which the card is prepared for release from the primary or secondary input hopper 10 or 12 by means of the vertical feed rollers 16 and 18. After being scrubbed down the punch card is advanced by means of the appropriate one of the horizontal feed rollers 30 or 22, and delivered to read station 14 whereat the informational content is scanned and stored in memory (not shown). The punch card after passing through the read station is projected into the wait station from whence it is released into the punch station in the manner outlined above.

The organization of the data recorder embodying the principles of the present invention is such that the READ ONLY operation is complete at such time as the leading edge of the punch card arrives at the punch station since by then the entire punch card will have cleared the read station 14. Thus the arrival of a punch card at the punch station signifies that another card may be released from the input section. Accordingly, essentially simultaneously with the arrival of the punch card at the print station the next successive card to be read will be scrubbed-down in preparation for processing through the read station. The previously read card will be stepped through the punch and print stations and stacked in the output stackers all at a rate of 70 IPS. Since the combined time required to scrub-down the next card and transfer it through the read station is slightly greater than the time it takes for the previously processed punch card to pass through the punch-point area and into the stacker (assuming the card is being processed through these sections at the rate of 70 IPS) there is no possibility of a collision between the card just being released from the input section and the card previously read and presently being stacked.

Normally the time required to perform a READ ONLY operation on a punch card is much less than that required to perform a PUNCH or PRINT operation. This is primarily due to the fact that the READ operation can be performed "on the fly" whereas in order to perform the PUNCH or PRINT operation the punch card must be stopped and remain stopped while the relatively slow punch and print mechanisms perform their respective operations. Not only is time lost while the card is at rest but the speed at which the card is incrementally advanced through the punch-print areas must be such as to permit stopping without overshooting. These slower print and punch card translation rates are dictated primarily by inertial considerations in that in order to be able to stop a moving punch card so that the desired column is accurately aligned at the punch or print station the card must be advancing at a reasonable rate.

Since, in the execution of a READ ONLY command the punch and print mechanisms are not involved, the card may be stepped through the punch-print areas without stopping. This factor is further taken advantage of in that since no stopping of the card in the punch-print area is anticipated, the stepping speed may be substantially increased. In the preferred embodiment of the present invention the speed of motor 34 is doubled. Thus in this and similar operations wherein the card preparation portions of the apparatus are not to be used, the punch card is translated through the punch-print areas at a rate of 70 IPS as opposed to the normal translating speed of 35 IPS.

Just when and how a speed of 70 IPS is introduced should become apparent from a review of the logical diagrams of FIGS. 4. What is important at this point is to note that something less than 10 punch cycles of 29.6 milliseconds each are consumed in processing successive punch cards through the data recorder when the latter is executing a READ ONLY command. This provides a throughput of some 200 CPM.

Figure 2A:
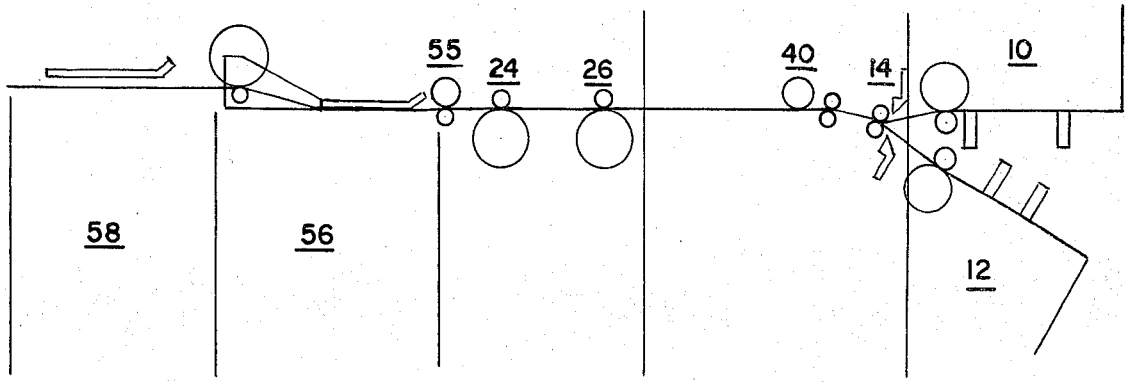
FIGS. 2A and 2B depict symbolically and in timed relationship the processing of a punch card through the data recorder when the latter is operating in the synchronous mode.
Figure 2B:
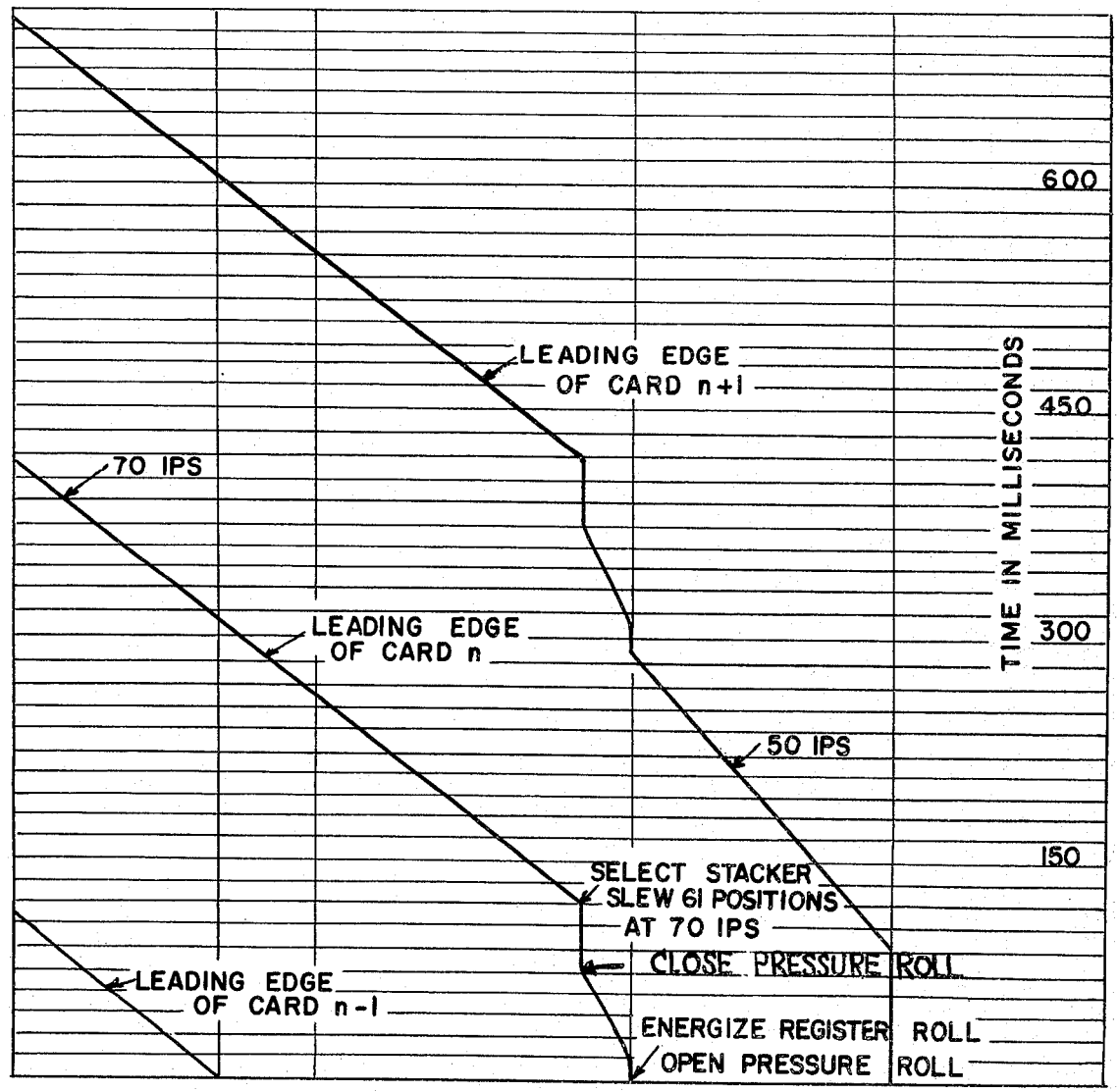
Figure 3A:
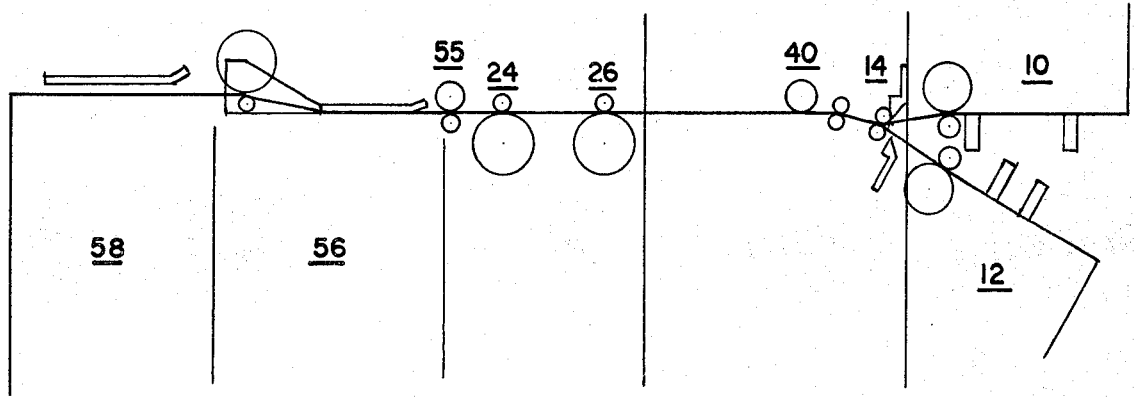
FIGS. 3A and 3B depict symbolically and in timed relationship the processing of a punch card through the data recorder in the time overlap mode.
Figure 3B:
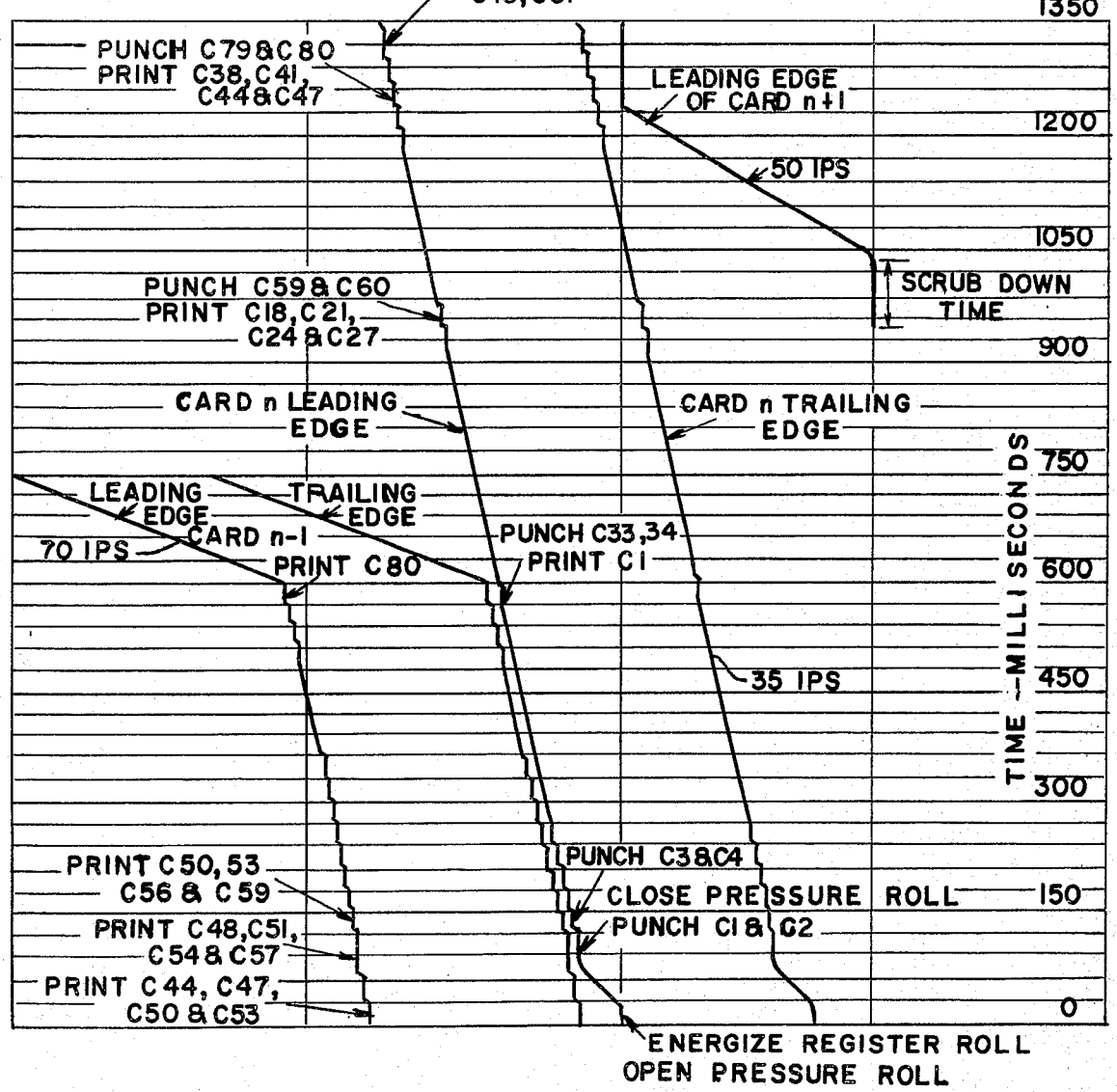

A comparison of the READ ONLY operation of FIGS. 2A and 2B with the PUNCH/PRINT operation of FIGS. 3A and 3B should be helpful in explaining other operational differences realized with the subject data recorder when operating in its alternative modes of operation. Perhaps the most distinct difference concerns the relatively high throughput achieved in the execution of a PUNCH/PRINT command. The means for achieving this are suggested by the close spacial relation between the trailing edge of Card $n-1$ relative to the leading edge of Card $n$ as seen in FIG. 3B.

It should be understood that whereas the timing diagram of FIG. 2B depicts a "best case" in terms of the processing time required to execute a READ ONLY command, FIG. 3B depicts a "worst case" for the PUNCH/PRINT operation. Thus, in FIG. 3B each of the step functions (PUNCH C3 & C4, etc.) represents a particular print or punch cycle as the case may be. Each such step comprises a vertical and a diagonal portion. The vertical portion represents the time during which the punch card is stationary for punching and/or printing, while the diagonal portion represents the relatively small portion of each punch/print cycle during which the punch card is actually moving.

Certain liberties have been taken in depicting the timing diagrams of FIG. 3B in that not every punch and/or print cycle is depicted as comprising a vertical and diagonal portion although time is represented as having been allowed for printing and punching in every position. If in fact blanks occur in certain columns indicating these columns are not to be punched or printed a time saving is realized which may be substantial particularly if an unbroken string of blanks occurs. This latter time savings is brought about by a facility of the instant data recorder to selectively slew past those columns where no information is to be entered and to stop only at columnar locations where punching or printing is to take place. The latter feature is only incidentally related to the subject invention as is pointed out more fully below.

It is important to realize that in processing punch cards through the data recorder in execution of the PUNCH/PRINT command a form of overlapping of the operations occurs in that just as soon as the punching of one card is complete a signal is generated indicating that the punch is capable of accommodating a new card. In anticipation of this, a new card will have previously been advanced into the wait station and upon generation of the aforementioned signal the new card will be released fro the wait station and advanced to the punch. Thus, as the balance of the preceding card is being printed, a new card is processed through the punch station. Because the indexing means for the punch and print stations are mechanically coupled by way of belt 54, the print operation will be interrupted for one operative cycle while the newly introduced punch card is registered at the punch; however, this is considered a cheap price to pay for the twenty or so cycles which in prior art devices are otherwise wasted until the printing of the preceding card is complete. The time-overlap mode of operation is characterized by the fact that the trailing edge of Card $n-1$ is sufficiently proximate to the leading edge of Card $n$ that printing of column 80 of Card $n-1$ occurs simultaneous with the printing of column 1 in Card $n$.

Figure 4B:
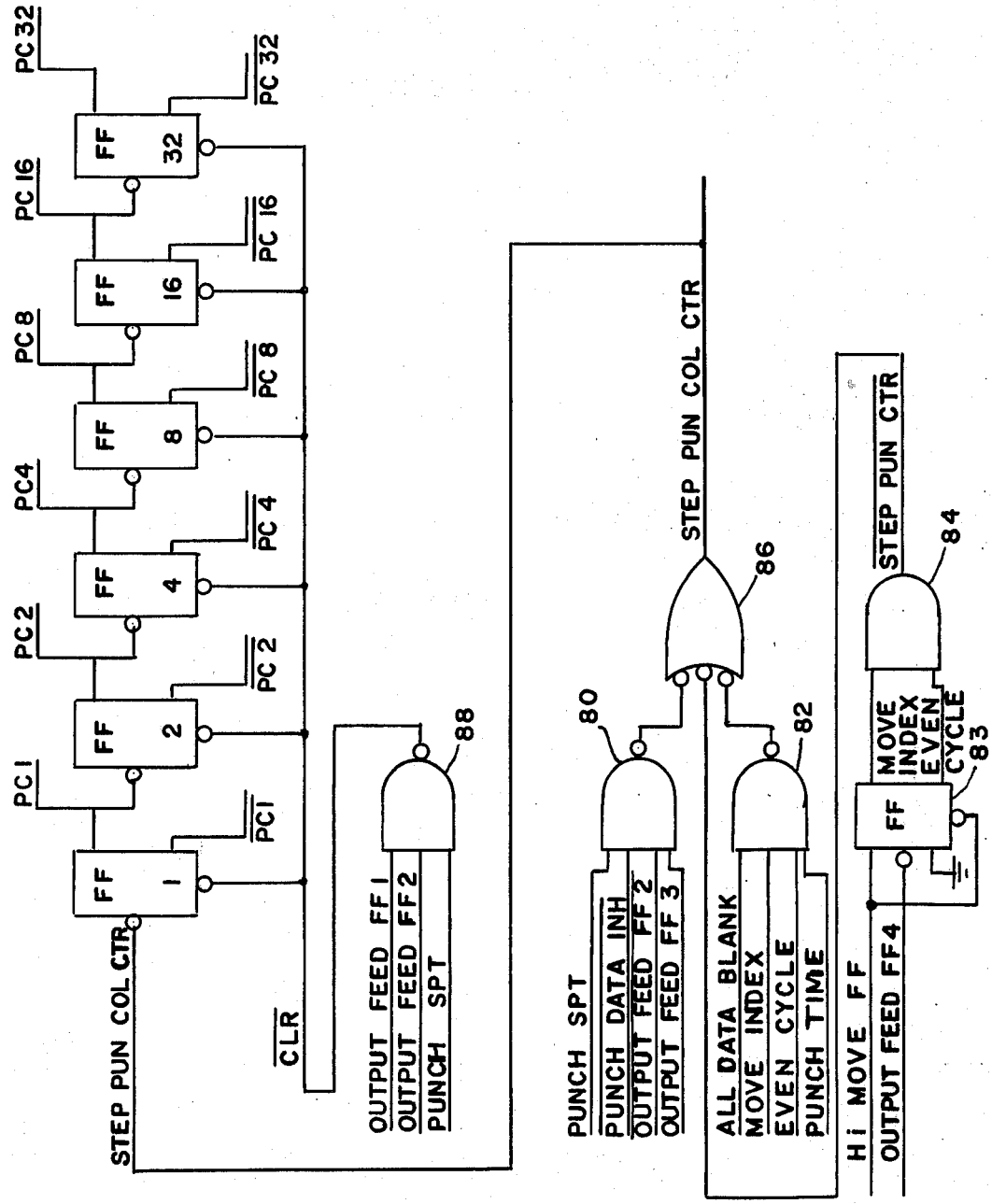
FIGS. 4A through 4P are circuit schematics illustrating the control and sequence selection circuits for stepping a punch card through the subject data recorder in either the synchronous or time overlap modes of operation.
Figure 4C:
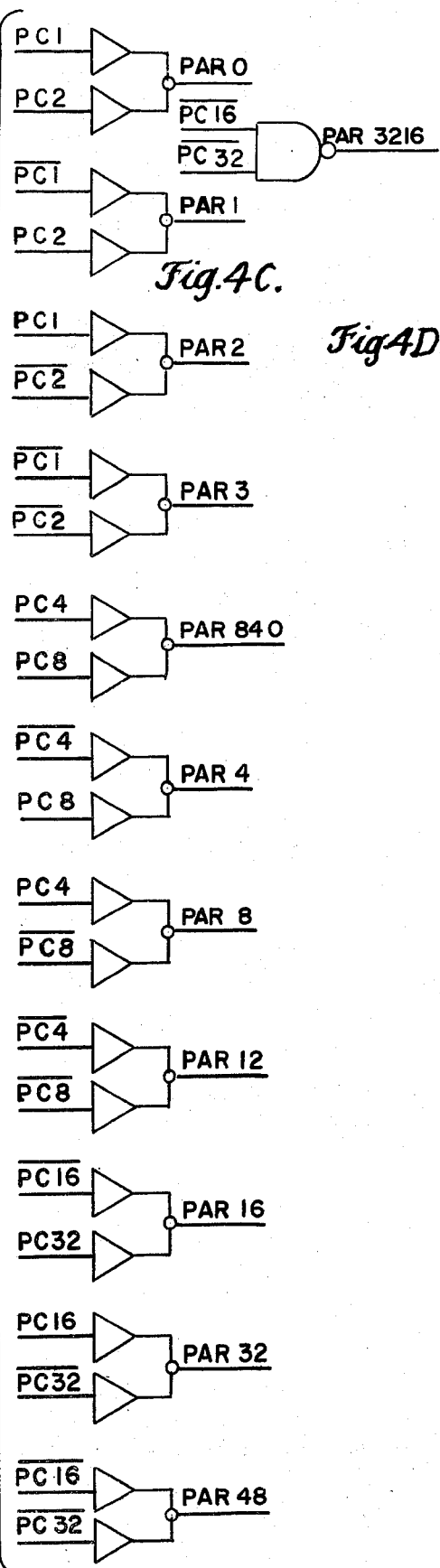
Figure 4D:
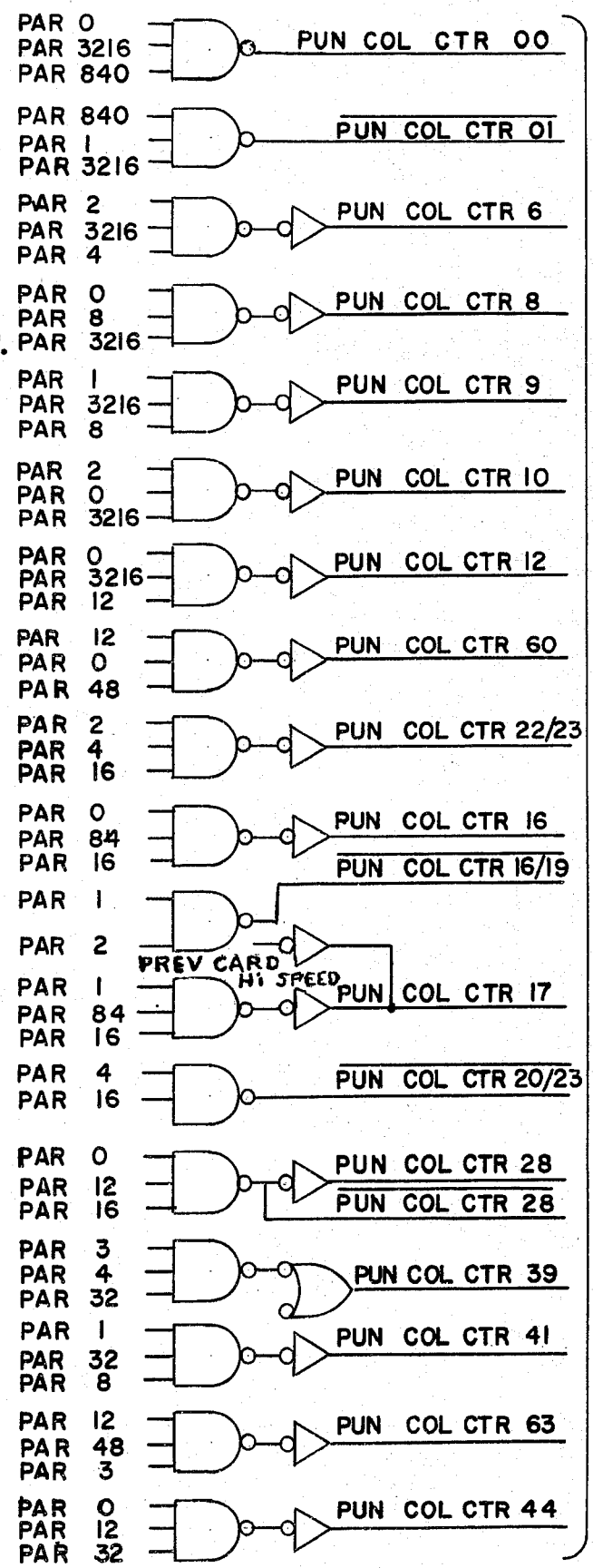
Figure 4E:
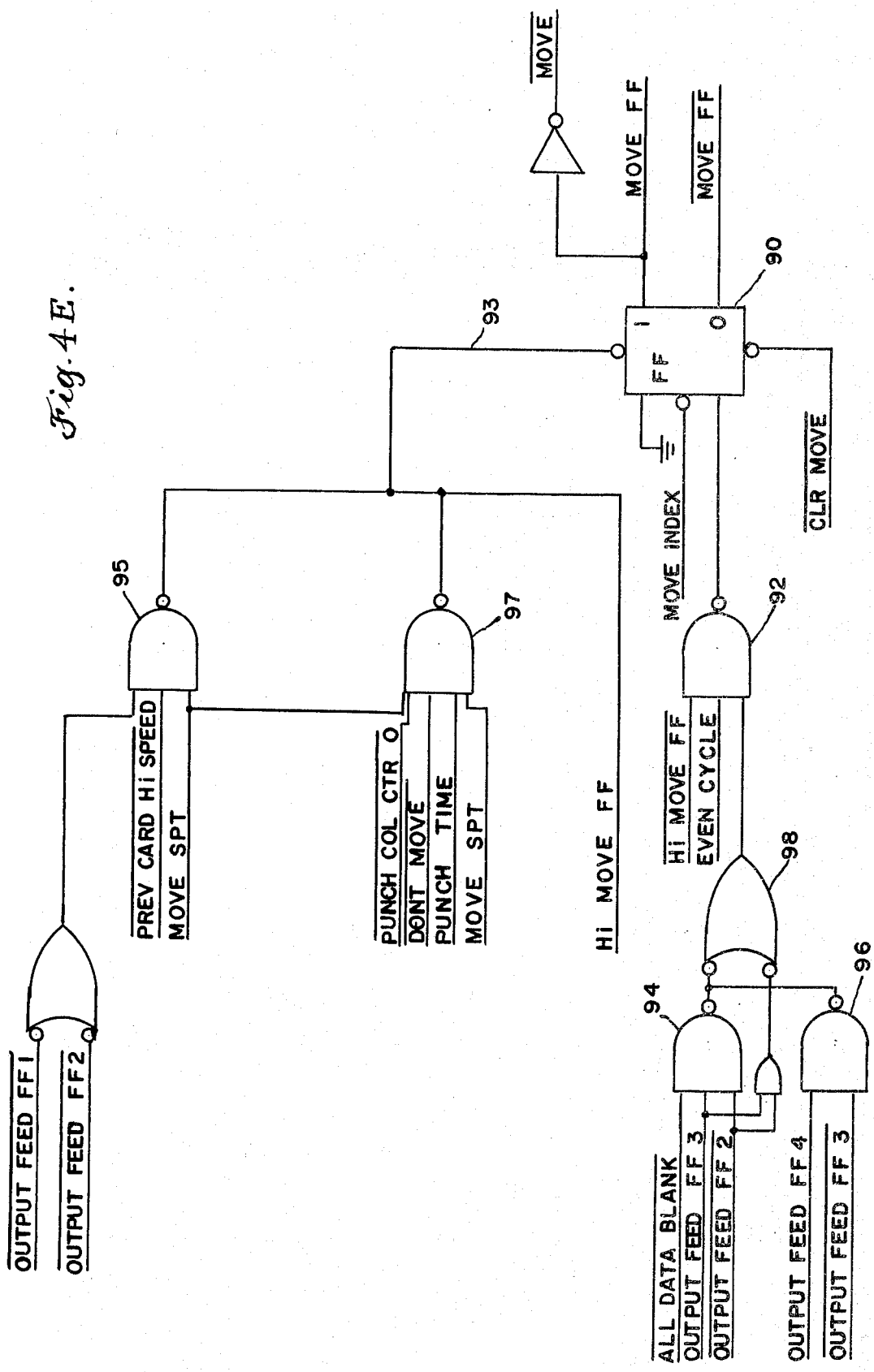
Figure 4H:
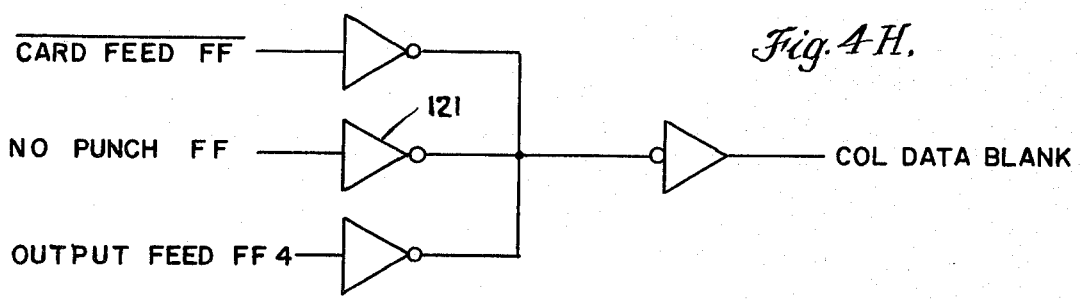
Figure 4I:
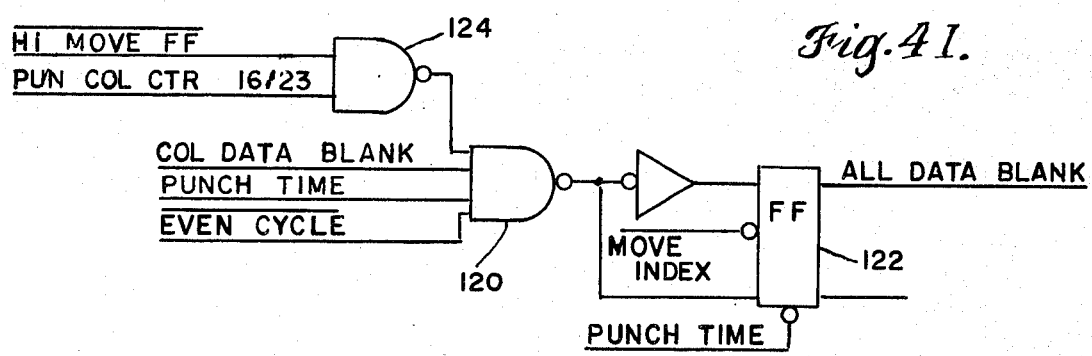
Figure 4O:
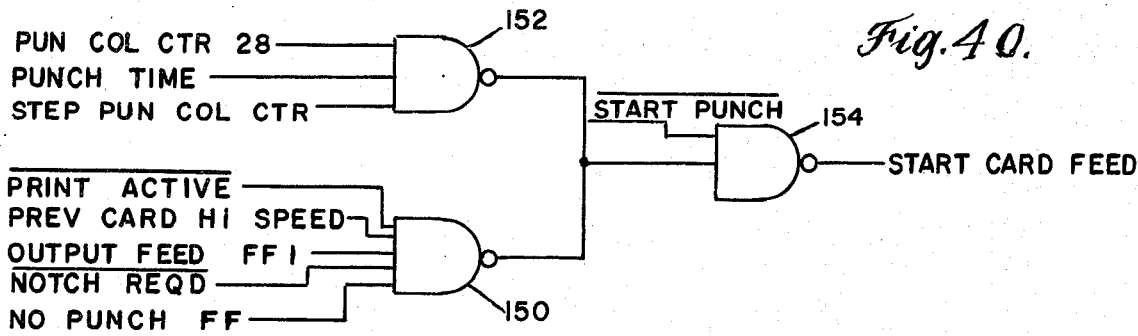
Figure 4F:
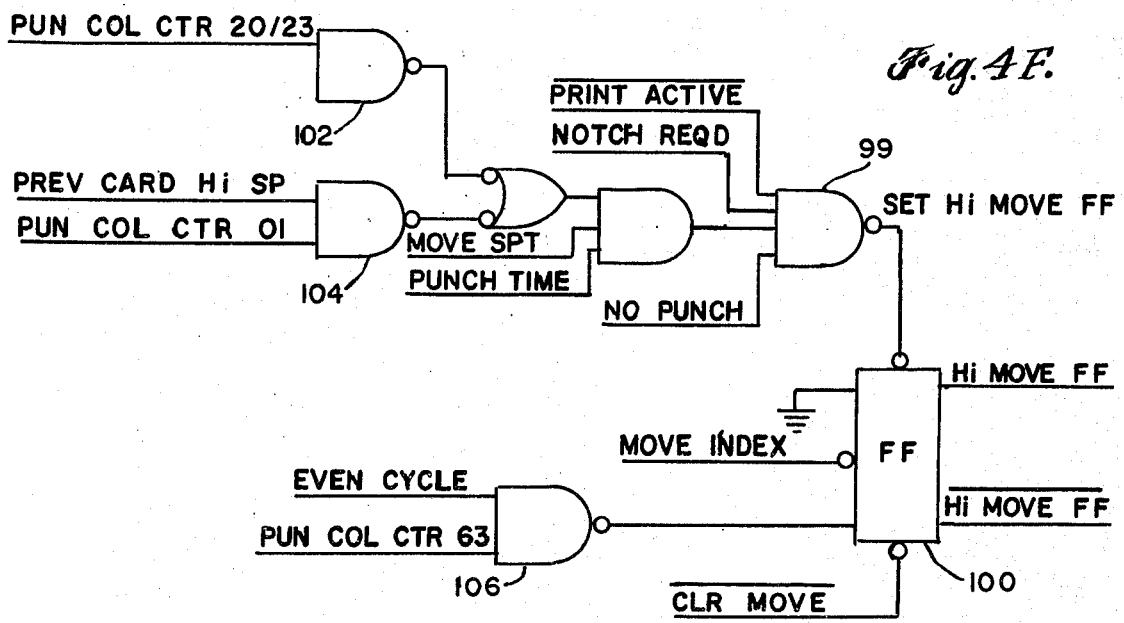
Figure 4J:
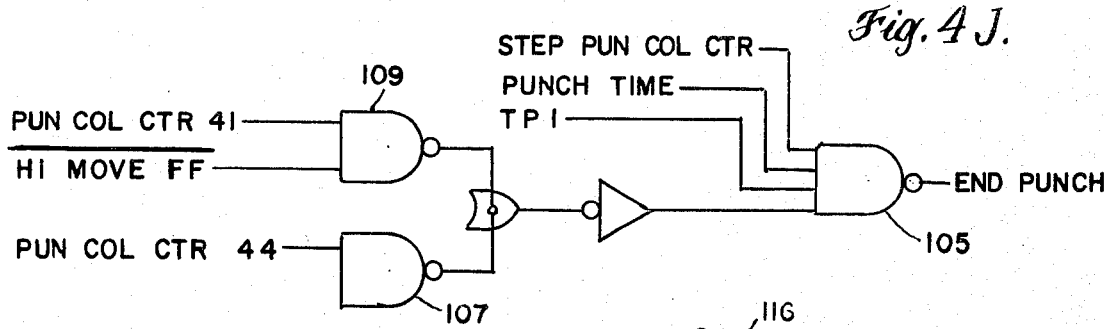
Figure 4G:
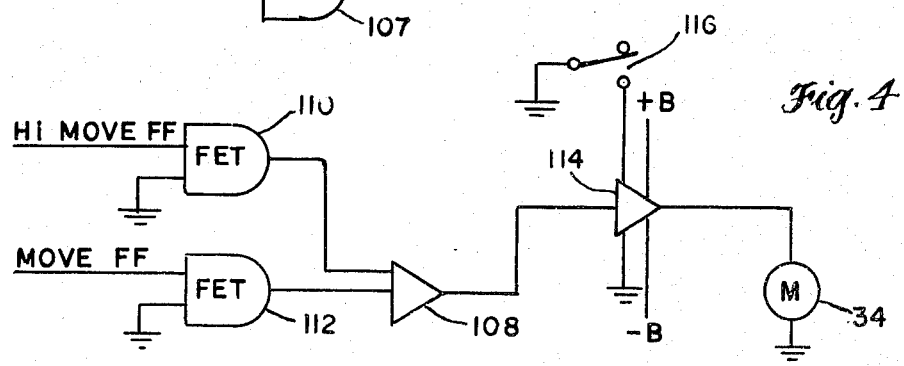
Figure 4N:
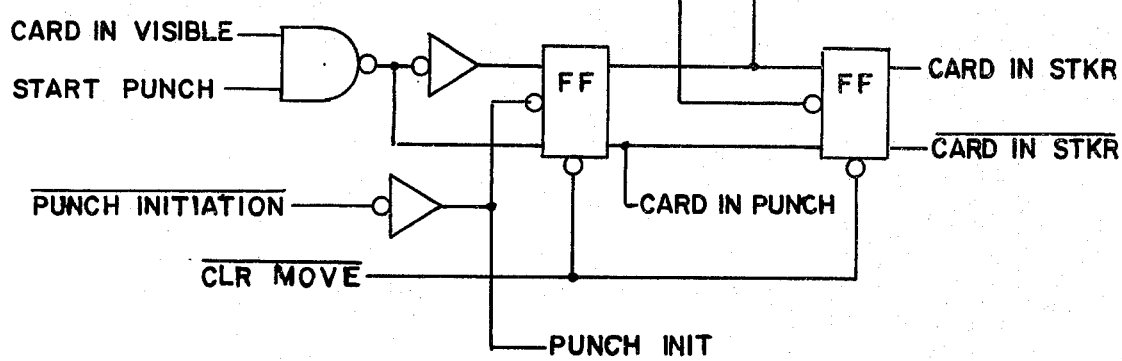
Figure 4P:
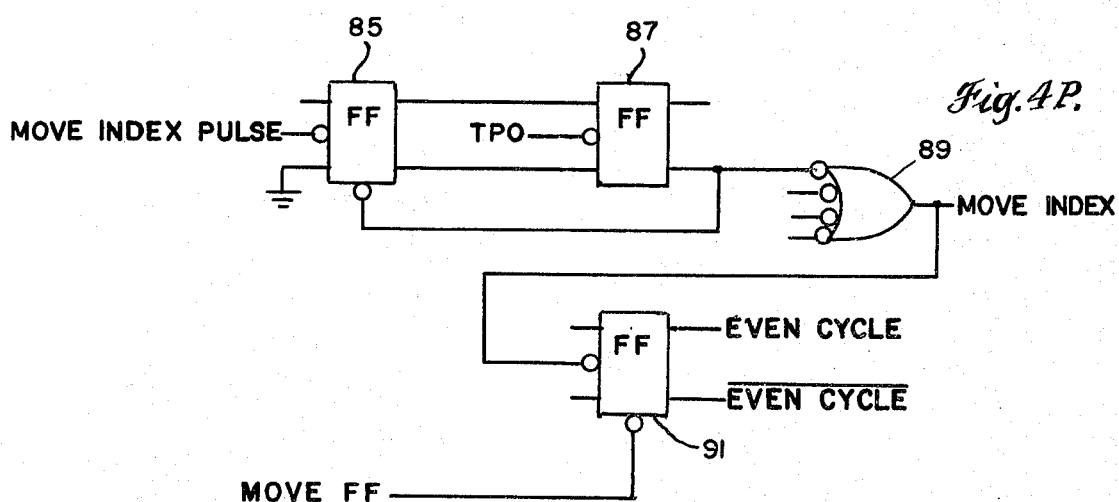

Reference is now made to FIGS. 4A through 4P which represent the logic needed to implement the subject invention. The logic circuits of FIGS. 4A through 4P are perhaps best understood if explained in terms of the comparative timing charts of FIGS. 5 and 6 which depict the PUNCH/PRINT mode of operation and the READ ONLY mode of operation respectively.

The processing of a card through the data recorder in both the PUNCH/PRINT mode and the READ ONLY mode is initiated by a START PUNCH signal, which signal may originate alternatively: at the keyboard; in the operator control panel; or the signal may enter the system via the interface, possibly having originated in some external data processing apparatus. A signal from one of these control points may for purposes of this description be thought of as originating with central control 70 (FIG. 1). The presence of such a signal causes input control 68 (FIG. 1) to generate a card motion command in the form of the START PUNCH signal. Because of the variety or circumstances which may give rise to the START PUNCH signal, the exact point in time during an operative cycle when it comes up is indefinite as is indicated by the dotted line portion of this signal in FIGS. 5 and 6.

The PUNCH SPT. and MOVE SPT. signals, derived from the timing disc 30 of FIG. 1 by way of the follower 32, may result fro the inductive sensing of the leading and trailing edges of the indentation 31 as the timing disc 30 rotates, the latter occurring once during each punch cycle. A punch cycle extends for some 29.6 milliseconds and is the time required to effect the punching (or printing) of two columns of information on the punch card. The PUNCH SPT. and MOVE SPT. signals are used extensively to synchronize other control signals generated in the logic of FIGS. 4A through 4P.

FIG. 4A depicts logic for generating control signals which are also basic to the operation of the subject data recorder. Four flip-flops FF1, FF2, FF3, and FF4 of FIG. 4A, each generates a corresponding OUTPUT FEED signal which comes up and remains up for a predetermined time during each operative cycle. Flip-flops FF1 through FF4 are of the type which require a gating pulse, such as the PUNCH SPT pulse in FIG. 4A, to condition the flip-flops so as to be responsive to a set or reset signal. Thus, OUTPUT FEED FF1 goes high in the presence of the START PUNCH signal and a PUNCH SPT signal. The next PUNCH SPT signal conditions flip-flop FF2 to its set state and the following PUNCH SPT signal conditions flip-flop FF3 to its set state. Feed back loops from FF2 and FF3 and FF1 and FF2 respectively reset the latter flip-flops while FF3 is reset by an END PUNCH signal which is generated at the end of each operative cycle by the logic of FIG. 4J discussed hereinbelow. FF4 is set toward the end of each operative cycle after a punch column counter (See FIG. 4B) has recorded a count of 39.

The punch column counter and the stepping logic of FIG. 4B comprise a conventional ring counter consisting of a plurality of flip-flops interconnected in such manner that when actuated by a binary input signal the outputs therefrom may be selectively combined to form any digital value from 0 through 63. The outputs of the punch column counter of FIG. 4B are selectively combined in the decoding logic of FIGS. 4C and 4D to provide a broad array of control signals which are relatively timed with respect to the initiation of an operative cycle of the data recorder. As an example, the signal PUNCH COLUMN COUNTER 39, used to set FF4 of FIG. 4A as discussed hereinabove, is derived directly by selectively combining various of these outputs.

The punch column counter of FIG. 4B is stepped by an output on any one of the three AND gates 80, 82, or 84, after being buffered through the OR gate 86. The nature of the signals used in conditioning AND gates 80, 82 and 84 should become more readily apparent from a further explanation of FIGS. 4, 5 and 6 as related to the various modes of operation of the system. At this time it should suffice to note that the punch column counter of FIG. 4B is responsive to pulses representing either actual punch cycles i.e., PUNCH SPT signals; or alternatively MOVE INDEX signals which have a much greater periodicity. These latter signals are derived from a timing disc mounted on the shaft of motor 34 and from the logic of FIG. 4P. In this respect MOVE INDEX PULSES may be generated by photoelectric means mounted on the output shaft of motor 34. Each such pulse represents an advancement of 1 columnar increment of the punch card. For this purpose the MOVE INDEX PULSES are used to toggle flip-flops 85 and 87 such that a corresponding number of MOVE INDEX signals are buffered through OR gate 89. Since in the subject data recorder printing and punching take place two columns at a time it is desired to recognize only every second one of the MOVE INDEX signals, this is done automatically by flip-flop 91, the output of which is herein denoted as the signal EVEN CYCLE.

Resetting of the punch column counter of FIG. 4B occurs during one of the preliminary steps of each operation during which time a new card is being registered at the punch 26. These preliminary steps characterize each command executed in the subject data recorder and are used to perform various "housekeeping" chores such as clearing the punch column counter so that it will be ready for the next operative cycle; as seen from the conditioning inputs to AND gate 88 this occurs during the 3rd punch cycle of each operation.

Among the operations which may be considered as preliminary to the execution of a PUNCH/PRINT command is the registration of the punch card at the punch station. This occurs as the punch card is advanced from the wait station by the register roll assembly 40. As the card is advanced the power card aligner 42 is energized to assure lateral registration of the punch card. At the same time the pressure roll 38 is opened slightly to permit the front edge of the card to pass between it and the index roll 36. These three operations are all initiated as OUTPUT FEED FF1 is set and are completed prior to initiation of the first punch operation, which occurs some four PUNCH SPT signals later.

It should be noted that these preliminary steps are the same whether the system is operating in the synchronous or the time-overlap mode of operation. Thus, from the time the START PUNCH signal sets the OUTPUT FEED FF1 through the completion of the registration step, the operation is the same for all modes of operation. However, the time it takes to complete an operation will vary considerably with whether the operation being performed is in the nature of a PUNCH/PRINT operation or of a READ ONLY operation. In the latter case the entire operation may be completed in an additional six punch cycles of 29.6 milliseconds each. Thus approximately 300 milliseconds of processing time is all that is required for a READ ONLY operation. In contrast, the PUNCH/PRINT operation may require as many as 41 additional punch cycles such that some one and one-third seconds are required from the time the card is initially fed into the punch station until it is deposited in the output portion. As mentioned above the substantial difference in processing time between the two modes of operation is accounted for by way of the fact that in the synchronous or high speed mode of operation the card is continuously moved through the punch-print area without stopping and it does so at a high motor speed whereas in the overlap mode of operation only a small portion of each punch period is consumed in actually moving the card, this being done at a slower motor speed. The major portion of each punch period finds the punch card at rest while the relatively slow punch and/or print mechanism completes its punching and/or printing operation.

At what rate a punch card is processed through the card preparation portion of the data recorder by motor 34 is determined essentially by the setting of two flip-flops, the MOVE flip-flop 90 of FIG. 4E and the HIGH MOVE flip-flop 100 of FIG. 4F. Before proceeding with an explanation of the conditioning logic for these two flip-flops it should be understood that it is the output of these flip-flops that directly determines the duration and magnitude of drive signals to motor 34. In this respect, MOVE flip-flop 90 will be intermittently set during the PUNCH/PRINT operation and it together with HIGH MOVE flip-flop 100 will be continuously set during the execution of a READ ONLY command.

Referring now to FIG. 4G it will be noted that the HIGH MOVE FF signal is combined with the MOVE FF signal in a summing amplifier 108 after being fed through field effect transistors (FET) 110 and 112 respectively. The output of the summing amplifier 108 is further amplified in a power amplifier 114 before being fed to the motor 34 of FIG. 1. The operation of the motor control circuitry of FIG. 4G is such that with the power on, i.e. switch 116 closed, an output signal will be generated from the power amplifier 114 to the drive windings of the variable speed motor 34 whenever a signal appears at the output of the FET's 110 or 112. The drive signal to the motor 34 is proportional to the output of the summing amplifier 108. Thus, the presence of the MOVE FF signal will drive motor 34 at a first predetermined speed which in the preferred embodiment of the present invention is such that the punch card is advanced at the rate of 35 IPS. If then the HIGH MOVE FF becomes set the addition of that signal in the summing amplifier 108 causes the motor speed to be increased such that the effective transfer rate of the punch card is 70 IPS.

Whether the punch card is advanced intermittently in short increments of 0.174 inches each punch cycle i.e., every 29.6 milliseconds, or whether the punch card is advanced at a continuous rate of either 35 IPS or 70 IPS, depends on the presence or absence of the MOVE and HIGH MOVE FF signals which in turn depends on the states of flip-flops 90 and 100 respectively. In addition to being continuously set during the high speed mode of operatin the MOVE FF 90 is set for a brief portion of each punch cycle as will become apparent from a further explanation of FIG. 4E.

Turning now to FIG. 4E, the MOVE flip-flop 90 will be set whenever a signal appears on the input lead 93. The latter signal obtains during the execution of a PUNCH/PRINT operation each time a MOVE SPT signal comes up provided the previous card was not processed at high speed and we are in punch time i.e. not the preliminary set-up portion of each operative cycle. Lead 93 to flip-flop 90 is likewise high during the transition to the high speed mode of operation provided that the preceding card (assuming it was not processed in the high speed mode) has been sufficiently advanced through the system that there is no possibility of a collision between it and the card presently in the punch station. The other condition for setting MOVE flip-flop 90 is that the HIGH MOVE flip-flop is set.

Resetting of MOVE flip-flop 90 will occur after each even cycled MOVE INDEX signal provided that the HIGH MOVE flip-flop is not set and an ALL DATA BLANK (See the explanation of FIGS. 4H and 4I given below) condition has not been detected during punch time. These conditions are all inputted to the reset side of flip-flop 90 by the conjunctive action of gates 92, 94 and 98.

It should be clear from the explanation of FIG. 4G above that the output of the MOVE flip-flop 90 conditions the motor 34 to step along such that it imparts a translation speed to the punch card of 35 IPS. The reset logic to MOVE flip-flop 90 is such that it will allow the motor 34 to continue to step the punch card along in an uninterrupted manner so long as the HIGH MOVE flip-flop is not set and blanks are sensed in corresponding columns of the punch card.

Reference is now made to the conditioning logic for the HIGH MOVE flip-flop 100 of FIG. 4F. Conditioning of the HIGH MOVE flip-flop 100 to its set state permits the doubling of the card advancement speed from 35 to 70 IPS by the motor 34. The high speed operation of motor 34 occurs only when no punching, printing, or verify notching of the punch card is required. A further condition which must be met preliminary to the processing of the punch cards in the high speed mode of operation is that the previously processed cards must also have been processed at the high speed. In the event this latter condition is not met, processing of the present card cannot take place until the punch column counter has registered a count of 23. This insures that the punch card waiting to be "high-speeded" out of the card preparation portion and into the output portion will not ram the trailing edge of the preceding card. This condition is satisfied by AND gate 102.

In the event the preceding card was processed at high speed there is no need to clear the output section before initiating processing of the card at the punch station in the high speed mode. It will be noted that once flip-flop 100 has been set it will remain set during subsequent MOVE INDEX cycles until the punch column counter records a count of 63 at which time the HIGH MOVE flip-flop is reset. A count of 63 in the punch column counter of FIG 4B insures that a card, which has been "high-speeded" through the preparation portion of the data recorder, is sufficiently advanced into the output portion such that a new card may be safely fed in from the wait station.

It should be noted that not all 64 MOVE INDEX pulses required to cycle the punch column counter are needed to process the punch card through the punch station. In fact, as indicated from the logic of FIG. 4J, a signal END PUNCH will appear on the output of AND gate 105 upon registration of a column count of 44 in the punch column counter of FIG. 4B. A count of 44 is sufficient to condition the input to AND gate 107 when the system is operating in the high speed mode. In the time-overlap mode a punch column counter count of 41 will condition AND gate 109 which in turn generates an END PUNCH signal. It is the END PUNCH signal which resets OUTPUT FEED flip-flop 3 and a fraction of a punch cycle thereafter, resets OUTPUT FEED flip-flop 4.

FIGS. 4H and 4I depict the logic necessary to generate a conditioning signal for stepping the punch column counter of FIG. 4B during the high speed mode of operation. As noted above, an independent feature of the instant data recorder enables a punch card to be selectively indexed to only those columnar positions wherein information is to be entered. In implementing the selective indexing feature, look ahead means are provided whereby information to be entered into the punch card is scanned on a columnar basis and upon detection of an all blank condition for one or more columns sets MOVE FF90 thus generating an ALL DATA BLANK signal to step the punch column counter of FIG. 4B. Meanwhile the output of MOVE FF90 energizes motor 34 causing it in turn to advance the punch card to the next columnar position at which information is to be entered. In executing the MOVE ONLY operation a signal COLUMN DATA BLANK is forced high for the entire card through the presence of a signal NO PUNCH at the input of gate 121 of the buffering logic of FIG. 4H. The presence of the COLUMN DATA BLANK signal at the input to AND gate 120 of FIG. 4I, for every odd cycle of the MOVE INDEX signal occurring during punch time, will condition an output from AND gate 120. This latter signal is in turn used to set flip-flop 122 thereby registering an ALL DATA BLANK condition.

The ALL DATA BLANK signal appears as an input to AND gate 82 of the punch column counter of FIG. 4B. In order to guard against a premature release of the card from the punch-print area, in the event that the preceding punch card was processed at the 35 IPS rate, AND gate 120 is inhibited until a column count of 23 has been registered; this signal being the output of the AND gate 124.

Reference is again made to the punch column counter of FIG. 4B; an explanation being hereinafter given as to the differences between the PUNCH/PRINT operation of FIG. 5 and the READ ONLY operation of FIG. 6 in terms of the conditioning signals which step the punch column counter. In this respect AND gate 80 generates a signal which steps the punch column for each PUNCH SPT signal which occurs during punch time, provided that no PUNCH DATA INHIBIT signal obtains. The latter signal will be present whenever the system is operating in the high speed mode or slewing over blanks. Since the periodicity of the PUNCH SPT signal is once every 29.6 milliseconds, the punch column counter will be stepped at that rate during the execution of a PUNCH/PRINT command.

As noted above, immediately upon registration of Card n at the punch station columns 1 and 2 are ready to be punched. At this time the punch column counter registered a count of 0. At this same time columns 48, 51, 54, and 57 of Card n−1 are aligned with print hammers 1, 2, 3, and 4. It will be noted that only one print cycle is lost in registering the new card at the punch station. The next succeeding PUNCH SPT signal again conditions AND gate 80 of FIG. 4B so as to step the punch column counter. The PUNCH SPT signal is followed almost immediately by a MOVE SPT signal which sets MOVE flip-flop 90; the latter being reset upon the occurrence of the second MOVE INDEx signal. During this time the punch cards in the print and punch stations will have been advanced two columnar positions such that columns 3 and 4 of Card n are now registered at the punch station while the printer is in position to print columns 50, 53, 56, and 59 of Card n-1. Sequencing of the cards through successive punch/print positions continues in this manner as is best indicated from FIGS. 3B and 5. This explanation also assumes that information is to be entered in each columnar position.

When a column count of 16 is registered in the punch column counter the system is in a position to punch columns 33 and 34 of Card n while it is printing column 1 of Card n and column 80 of Card n−1. During the following punch cycle, with the punch column counter registering a count of 17, the printing of Card n−1 will have been complete and a STACKER PINCH signal will go out to the stacker pinch roll to release the card into the output portion at the rate of 70 IPS. The logic for effecting the generation of the STACKER PINCH signal is seen in FIG. 4K.

Figure 4K:
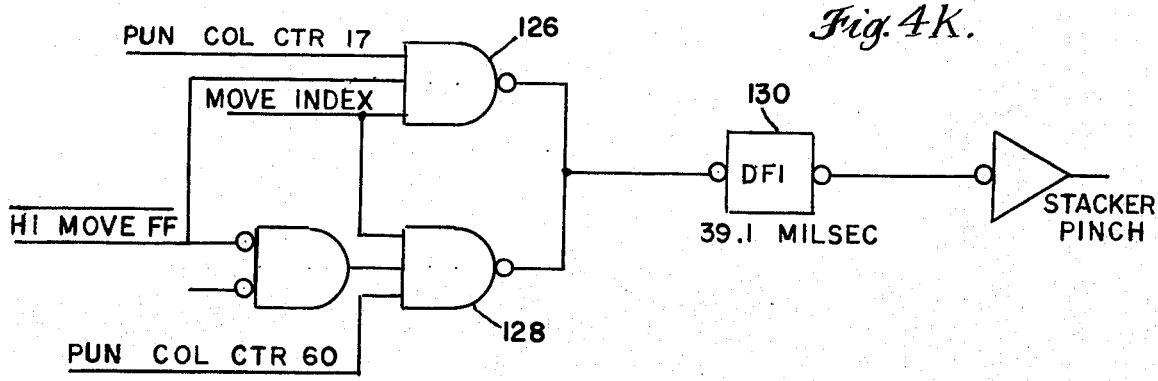

Referring now to FIG. 4K, it is seen that in processing punch cards in the PUNCH/PRINT mode, AND gate 126 is conditioned when the punch column counter of FIG. 4B registers a count of 17. In contrast, when the HIGH MOVE flip-flop is set, AND gate 128 is conditioned to generate an output when the punch column counter of FIG. 4B registers a count of 60. This difference in timing is related to the two different modes of operation since when operating in the high speed mode advancement of the punch card through the punch and print areas and into the output portion takes place all in one operative cycle whereas when operating in the PUNCH/PRINT mode the punch is operating on Card n while the stacker is stacking Card n−1. The output of the AND gates 126 and 128 are inputted into a delay feed line 130 which generates an output signal for some 39 milliseconds. The output of the delay line 130 is the signal STACKER PINCH which energizes the stacker pinch roll 55 of FIG. 1 thereby ejecting the punch card into the output portion for stacking in either stacker 56 or stacker 58.

Whether the punch card being ejected into the output portion will be stacked in stacker 56 or stacker 58 depends upon the position of the stacker deflector 64. Positioning of the stacker deflector, or gate, will have been accomplished early on in the cycle and no delay in processing the card will be incurred thereby.

Figure 4L:
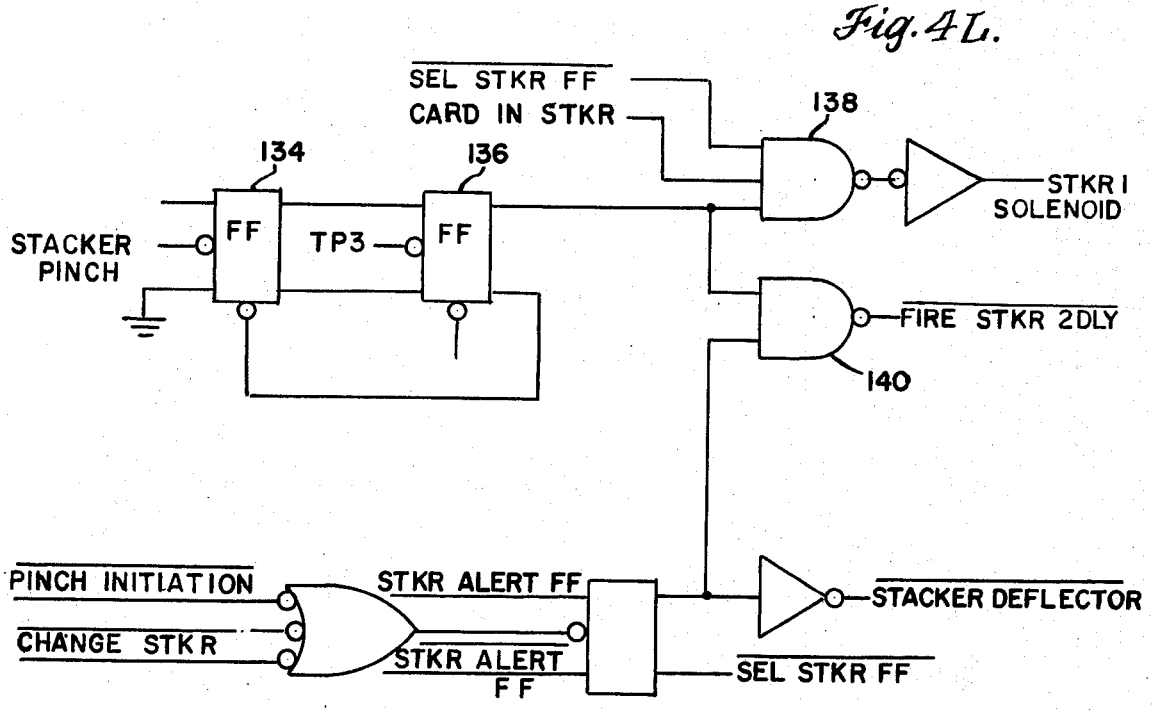
Figure 4M:
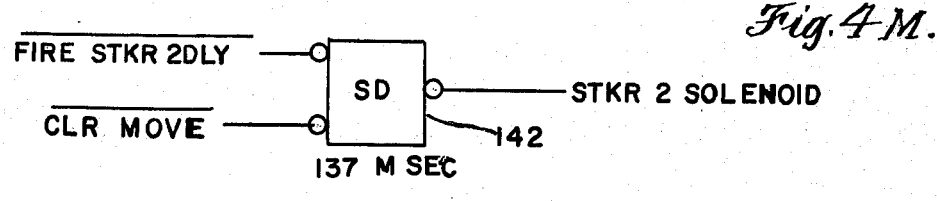

As will be seen from FIG. 4L the trailing edge of the STACKER PINCH signal sets flip-flop 134 and upon the occurrence of the next internal clocking signal TP3 flip-flop 136 is set; however, it remains set for only a fraction of a punch cycle. During the brief period of time flip-flop 136 is set its output partially conditions AND gate 138 which responds to the presence of a card in the stacker by generating a signal to the stacker 1 solenoid. The output of flip-flop 136 also conditions a second AND gate 140 which in turn generates a signal to a second delay line 142 for actuating the stacker 2 solenoid a predetermined time thereafter to thus facilitate stacking of the punch card in stacker 58 if in fact the deflector 64 is properly set to deliver the punch card thereto.

In the PUNCH/PRINT mode of operation the deflector 64 is energized for Card n while Card n+1 is being registered at the punch station. At this time Card n is still being processed through the print station, the leading edge being some 2 inches from the deflector. The punch card is transported into the output portion by means of the print index roll 51 and its cooperating pinch roll 52 at the rate of 35 IPS. In contrast, processing in the high speed mode is a one cycle operation with the deflector 64 being energized for Card n just after it is registered at the punch station.

Conventional storage means are used to store information as to the setting of the deflector 64 so that that information is available at the appropriate time to energize the deflector. As may be seen, upon reference to the bottom portion of FIG. 4L, information concerning the setting of the deflector 64 is stored in a SELECT STACKER flip-flop which in turn is set by the output of the STACKER ALERT flip-flop, as indicated. Information concerning the presence or absence of a punch card in the principal operating portions of the data recorder is stored in the circuitry of FIG. 4N. Derivatives of the signals used to condition the logic of FIG. 4N are used to condition other portions of the logic of FIGS. 4A through 4P. Accordingly, the signals generated in the logic of FIG. 4N may be thought of as controlling the release of a punch card from any one portion of the system into the next succeeding portion.

Referring once more to FIG. 5, the balance of the PUNCH/PRINT command is executed in similar fashion to that outlined above. It should be noted that upon registration of a count of 39 in the punch column counter OUTPUT FEED FF4 is set and remains set until a clumn count of 41 is registered whereupon both output feed flip-flops FF3 and FF4 are reset. This marks the completion of an operative cycle in the punch/print mode as the punch is now ready to accept card n+1 while the printer continues to print the remaining columns of Card n.

In contrast to the relatively slow processing rate which characterizes the execution of a PUNCH/PRINT command, the READ ONLY operation is accomplished in rather short order. As will be noted with respect to FIGS. 2B and 6, any one of a series of cards being processed in the READ ONLY mode will have been released from the input hoppers 10 or 12 simultaneously with the initiation of processing of the preceding card through the punch-print areas. This early release is effected under the control of a START CARD FEED signal which is generated in the logic of FIG. 4 O. Thus, an output from AND gate 150 occurs during the time OUTPUT FEED FF1 is set, provided the card about to be released is to be processed in the high speed mode. Alternatively, when the subject data recorder is processing in the time-overlap mode, a new card is fed into the wait station upon registration of a count of 28 in the punch column counter as indicated by the conditioning leads to AND gate 152. One further restriction on the generation of the START CARD FEED signal is imposed by AND gate 154, this being that card release cannot occur while START PUNCH signal is high. This avoids premature delivery of a punch card into the wait station.

Referring once more to FIG. 4B, it will be noted that AND gate 82 will be conditioned to generate an output for each even cycled MOVE INDEX pulse during PUNCH TIME when an ALL DATA BLANK conditions obtains. As indicated above with respect to the discussion of FIG. 4I, the ALL DATA BLANK condition obtains continuously throughout the time the HIGH MOVE flip-flop 100 is set. Thus, every even cycled MOVE INDEX pulse steps the punch column counter until a count of 44 is registered at which time PUNCH TIME is complete. By this time the trailing edge of the punch card has cleared the punch station but it still must be moved through the print station and into the output stacker area before a new card can be introduced at the punch station. For this purpose flip-flop 83 and AND gate 84 act in conjunction to continue to step the punch column counter upon the occurrence of each even cycled MOVE INDEX signal so long as the HIGH MOVE flip-flop 100 remains set. As indicated above with respect to the explanation of FIG. 4F, the HIGH MOVE flip-flop remains set until a count of 63 has been registered in the punch column counter. This signifies the completion of one operative cycle in the high speed mode of operation with the MOVE flip-flop being reset the next MOVE INDEX signal after the HIGH MOVE flip-flop goes low.

This completes the explanation of the operation of the subject data recorder in both the high speed or synchronous mode of operation and the time-overlap mode; however, before concluding the description of the preferred embodiment it should be noted that with minor modifications the system works equally well for both long (80 column) and short (51 column) punch cards. Thus, while the preferred embodiment of the device has been shown and described it is not intended to limit the scope of the invention to the particular form thereof and alternative form of the device will immediately be evident to those skilled in the art.

What is claimed is:

1. A punch card apparatus comprising an input portion, a card preparation portion, and an output portion, control means operatively connected to each of said portions, said control means connected to control the timing of punch cards being processed through said input, card preparation and output portions of said apparatus, means including said control means for normally allocating at least two clocking cycles to effect the processing of a punch card through said card preparation and output portions of said apparatus, said control means comprising means operative to sense the nature of the operation to be performed on the next punch card to be processed through said apparatus and additional means to sense the relative position of any punch card currently being processed through said card preparation and output portions, and means including said control means responsive to signals generated to said sensing means to increase the throughput of punch cards in said card preparation portion of said apparatus such that a subsequently processed punch card will be processed through said card preparation and output portions of said apparatus in a lesser number of clocking cycles than is normally allocated to the processing thereof.

2. A punch card preparation and processing apparatus in the nature of that described in claim 1 said apparatus being further characterized in that said preparation portion of said apparatus comprises a punch station and a print station and said output portion of said apparatus comprises a plurality of output stackers for selectively stacking punch cards therein, said control means for said card preparation portion normally effecting the preparation of a punch card at the same time as said control means associated with said output portion is effecting the stacking of a previously prepared punch card.

3. A punch card preparation and processing apparatus comprising an input portion, a card preparation portion, and an output portion, said input portion comprising means for feeding punch cards into said card preparation portion and for scanning the informational content of said punch cards being fed therethrough, said preparation portion comprising punching and printing means for entering information into said punch cards advanced thereto from said input portion, said output portion comprising a plurality of output stackers into which punch cards being fed from said input portion through said card preparation portion are selectively deposited; control means connected to said input, output, and card preparation portions of said apparatus to independently control the feeding, preparation and stacking of said punch cards, said control means including timing means normally operative to sequence punch cards through said card preparation and output portions in two operative cycles such that at any point in time a first punch card may be being processed in said card preparation portion at the same time as a second punch card is being processed through said output portion, and means including said control means for sensing the nature of the processing operation to be performed on a punch card entering said preparation portion and for sensing the nature of the processing operation performed on the immediately preceding punch to be processed through the output portion and for generating control signals in response thereto such that said punch card entering said preparation portion may be sequenced through said preparation and output portions of said apparatus in a single operative cycle.

4. A punch card preparation and processing apparatus in the nature of that described in claim 3 being further characterized in that said control means further comprises motor speed control means operatively connected to a motor for transporting said punch cards through said card preparation portion of said apparatus whereby the speed of the motor is determined by said control signals jointly generated in response to the nature of the processing operation to be performed on a punch card entering said preparation portion and the nature of the processing operation performed on the immediately preceding punch card to be processed through said output station.

5. A data processing apparatus for punch cards comprising an input portion, an output portion and a card preparation portion, said input portion comprising means for scanning the informational content of a punch card being fed into said apparatus, said output portion comprising a plurality of stackers for selectively stacking said punch cards, said card preparation portion comprising punching and printing means capable of simultaneously punching and printing on the same punch card, said simultaneous punching and printing occuring on a columnar basis whereby the time required to process said punch card through a columnar increment is defined as one punch cycle, control means operatively connected to each of said portions for asynchronously sequencing punch cards therethrough, said control means including means to sense the presence of a punch card within any one of said portions and to store an indication thereof, and means connected to said last named means to control the release of a punch card from any one portion into the next succeeding portion in timed relationship with respect to the release therefrom of an immediately preceding punch card, said last named means further comprising means responsive to a signal indicating the completion of punching of a first punch card to interrupt the printing thereof for one punch cycle during which a second punch card is registered at said punching means, said last named control means initiating the punching of said second punch card and the printing of the balance of said first punch card during the next succeeding punch cycle whereby neither card overlap nor any appreciable card separation exists between said first and second punch cards.

6. A punch card preparation and processing apparatus in the nature of that described in claim 5 said apparatus being further characterized in that said punching and printing means comprise means enabling the simultaneous punching and printing in plural columns of said punch card, said control means for effecting the timely release of said succeeding punch card upon completion of the processing of said preceding punch card including means operative to enable said printing means to print the last column of said preceding punch card simultaneously with the printing of the first column of said succeeding punch card.

7. A punch card apparatus comprising input storage means for storing a plurality of blank and pre-punched cards, card scanning means for scanning the informational content of said pre-punched cards, card preparation means for selectively punching and printing punch cards advanced thereto from said input storage means, output storage means adapted to store said punch cards upon completion of the processing thereof, transfer means operatively interconnecting said input storage means said card scanning means said card preparation means and said output storage means and adapted to transfer a punch card from said input storage means past said card scanning and card preparation means and into said output storage means, and control means operatively interconnecting said input storage means said card scanning means said card preparation means and said output storage means, said control means including means responsive to the relative position of punch cards within said apparatus at any one time, said last named means further responsive to the nature of the processing operation to be performed by said punch card apparatus on an incoming punch card, and means conditioned by said last named means to vary the speed of said transfer means and hence the time it takes to process a card through said apparatus.

8. An arrangement for advancing a punch card through a card preparation and processing apparaus in either of two modes depending on the nature of the processing operation to be performed by said card preparation and processing apparatus on an incoming punch card and card traffic within the apparatus, comprising: a card feed station, a card read station, a card preparation station comprising both punch and print portions, and an output stations; control means connected to sense the operative status of each of said stations and to control the transfer of punch cards therethrough, means including said control means to monitor the position of punch cards within said apparatus, and means operatively connected to said monitoring means and to said control means to change the rate of card movement through one or more of said stations depending on the type of processing operation to be performed by said card preparation and processing apparatus on the next punch card to be released from said feed station and the relative position of punch cards already in said apparatus.

* * * * *